United States Patent [19]

Gunsing

[11] Patent Number: 5,049,112
[45] Date of Patent: Sep. 17, 1991

[54] DRIVING SYSTEM FOR AUXILIARY EQUIPMENT

[75] Inventor: Johannes T. G. Gunsing, Eindhoven, Netherlands

[73] Assignee: Van Doorne's Transmissie B.V., Tilburg, Netherlands

[21] Appl. No.: 611,239

[22] Filed: Nov. 8, 1990

[30] Foreign Application Priority Data

Nov. 8, 1989 [NL] Netherlands .......................... 8902766

[51] Int. Cl.⁵ .............................................. F16H 63/00
[52] U.S. Cl. ............................................ 474/8; 474/18
[58] Field of Search ....................... 474/11, 12, 17, 18, 474/69, 70, 8

[56] References Cited

U.S. PATENT DOCUMENTS 4,458,318  7/1984  Smit et al. ........................ 474/18 X
4,784,630  11/1988  Takahashi ............................ 474/28

FOREIGN PATENT DOCUMENTS 0110063  5/1987  Japan .

Primary Examiner—Thuy M. Bui
Attorney, Agent, or Firm—Pennie & Edmonds

[57] ABSTRACT

Auxiliary equipment in a vehicle such as dynamo, fan, pumps etcetera are coupled to an engine by a continuously variable transmission. The pump is connected to the secondary shaft of the transmission, whereas the rest of the equipment is coupled to the shaft 9 via a controllable clutch. Engaging of the clutch takes place with a signal provided by per example a Pitot tube fixed to a secondary pulley of the transmission in dependence on the number of revolutions of the shaft.

8 Claims, 1 Drawing Sheet

DRIVING SYSTEM FOR AUXILIARY EQUIPMENT

BACKGROUND OF THE INVENTION

The invention relates to a driving system for auxiliary equipment.

In such generally known systems, which are inter alia used in buses, lorries and in the mostly somewhat larger passenger cars, the driving of auxiliary equipment, such as the dynamo, the fan, the power steering pump, the air compressor for e.g. the brakes, the air suspension, the cabin suspension, the airconditioning compressor, the water pump, and the lubricating oil pump takes place by means of V-belts ropes or gearwheels which are driven by the crankshaft of an engine.

With such known driving systems the number of revolutions of the shaft with which the auxiliary equipment is driven will vary along with the engine speed, as a result of which, when the engine speed is low, there will be the problem that a number of components of the auxiliary equipment, such as e.g. the power steering pump or the air compressor, get critically close to their minimally allowable performance limit, or even get below this limit in the long run, unless said components, at the expense of a larger power input, or a reduced compactness, are specially designed to cope with this. Conversely, a high number of revolutions creates the problem of the auxiliary equipment delivering a higher performance than necessary, as a result of which energy and fuel are wasted at the expense of a reduced net available engine power for driving the vehicle. It is noted hereby that the amount of power wasted may be considerable, given the fact that the maximum power drawn by auxiliary equipment varies between about 15 KW and 40 KW, whereby it should be considered that 40 KW corresponds with the maximum power produced by a 1300 cc petrol engine of an average passenger car.

SUMMARY OF THE PRESENT INVENTION

The object of the invention is to provide a driving system for auxiliary equipment, in which the loss of power over the entire speed range of the engine is limited and whereby it is ensured that the auxiliary equipment can perform maximally even when the engine speed is low.

In order to accomplish that objective the driving system for auxiliary equipment mentioned in the preamble is according to the invention characterized in that the system comprises a continuously variable transmission with a primary shaft to be driven by the engine, a secondary shaft as well as an outgoing shaft which can be driven by said secondary shaft.

One embodiment of the driving system for auxiliary equipment mentioned in the preamble is according to the invention characterized in that the system furthermore comprises a pump mounted on the secondary shaft and a clutch connected between the secondary shaft and the outgoing shaft.

The advantage of this embodiment of the driving system according to the invention is that immediately after the engine has been started a pressure delivered by the pump is available, even before any energy has been spent on setting the other auxiliary equipment in action and without any time having been lost on e.g. the necessary engagement of a clutch for the other auxiliary equipment after the engine has been started. An additional advantage of disposing the pump on the secondary shaft is that a lower pump capacity is required and that the pump is loaded at a lower average number of revolutions. After the clutch has engaged the auxiliary equipment can run at a higher number of revolutions than normal at idling speed. As a result of this e.g. the air pressure for the brakes will sooner reach its required level and thus it is possible to drive off comfortably sooner than before after starting. Moreover, this leads to a slight reduction of the environmental pollution and fuel and labour costs are saved. At the same time the system according to the invention enhances safety, since in particular the braking pressure and the pressure for the power steering system are sooner available than before.

With the present invention it has namely been recognized that the pump under the auxiliary equipment plays a very important role, in particular immediately after the engine has been started. The clutch in the system according to the invention is namely disposed in such a manner that the auxiliary equipment, exclusive of the pump, does not come into operation before this is required. The system according to the invention makes it possible in a simple manner to run the continuously variable transmission and the pump up to speed immediately after the engine has been started, and then run the other auxiliary equipment up to speed as desired. After the auxiliary equipment has been engaged the number of revolutions can furthermore be influenced by means of the continuously variable transmission and be kept at a constant level as desired. By influencing the number of revolutions of the secondary shaft by means of the continuously variable transmission and keeping said number of revolutions at a substantially constant level during idling it is achieved that there is no longer any excess capacity of the auxiliary equipment, occurring at higher speeds of the outgoing shaft. Said excess capacity namely leads to power being unnecessarily drawn from the engine, resulting in reduced performance, especially when the vehicle accelerates. Furthermore said excess capacity imposes an unnecessarily high burden on the environment. Compared with conventional systems the net available engine power is increased by 5-10% when the system according to the invention is used in a like motor.

Furthermore it is possible by means of the continuously variable transmission to run up the auxiliary equipment to a slightly increased number of revolutions if desired, so that e.g. also at idling speed of the engine the auxiliary equipment can still deliver an extremely high performance. Certain components of the auxiliary equipment, which had to be selected relatively voluminous in order to perform adequately even at low idling speed, can be made more compact by using the system according to the invention, which inter alia leads to a gain in space and a lower investment required.

Also it is possible that, when the auxiliary equipment which is installed has a large capacity, the constant number of revolutions is slightly reduced in order to limit the torque to be delivered by the engine at idling speed. This can be done by keeping the transmission ratio constant between idling speed and a slightly higher engine speed, and by only regulating a constant number of revolutions for the secondary shaft above that level.

One embodiment of the driving system is according to the invention characterized in that the driving system contains means for delivering a signal which is a measure for the number of revolutions of the secondary shaft, and that the clutch is of an engageable construction and is connected to said means for coupling, at the control of the signal, the secondary shaft to the outgoing shaft and the auxiliary equipment disposed thereon when a minimum limiting value of the number of revolutions of the secondary shaft is exceeded.

The advantage of this embodiment of the driving system according to the invention is that when the pressure of the system has been raised and the system has attained its speed, also the other auxiliary equipment is brought up to speed, and that a minimum number of revolutions (unequal to 0) of the auxiliary equipment is ensured at idling speed at all times.

One embodiment of the driving system which has appeared to be advantageous in practice is according to the invention characterized in that the minimum limiting value of the number of revolutions above which the clutch engages lies under the nominal number of revolutions of the secondary shaft.

A further embodiment of the driving system is according to the invention characterized in that the clutch is arranged such that it disengages above a maximum limiting value of the number of revolutions of the secondary shaft, which lies above the nominal number of revolutions of the secondary shaft.

The advantage of this further embodiment of the driving system according to the invention is that it prevents that the number of revolutions of the driving means gets too high. Furthermore it is prevented with this embodiment that needless wear occurs and that an needlessly large amount of energy is drawn by the auxiliary equipment.

Another embodiment is according to the invention characterized in that the system is arranged in such a manner that, also when the maximum engine speed is exceeded, the number of revolutions of the secondary shaft remains constant.

The advantage of this embodiment is that temporary overloading can be accommodated without damage being done to the auxiliary equipment.

Yet another embodiment of the driving system is according to the invention characterized in that the torque at which the clutch starts to slip is lower than the torque at which the continuously variable transmission starts to slip.

The advantage of this embodiment of the driving system according to the invention is that the clutch serves as a mechanical safety device for the comparatively costlier continuously variable transmission. Furthermore the amount of wear is limited by this embodiment and the life of the continuously variable transmission is lengthened as a result. The mechanical safety device can be arranged in such a manner that also with extreme alterations of the engine speed the clutch will slip only very briefly. As a result the pump capacity can be limited.

DESCRIPTION OF THE PREFERRED EMBODIMENTS

Figure 1:
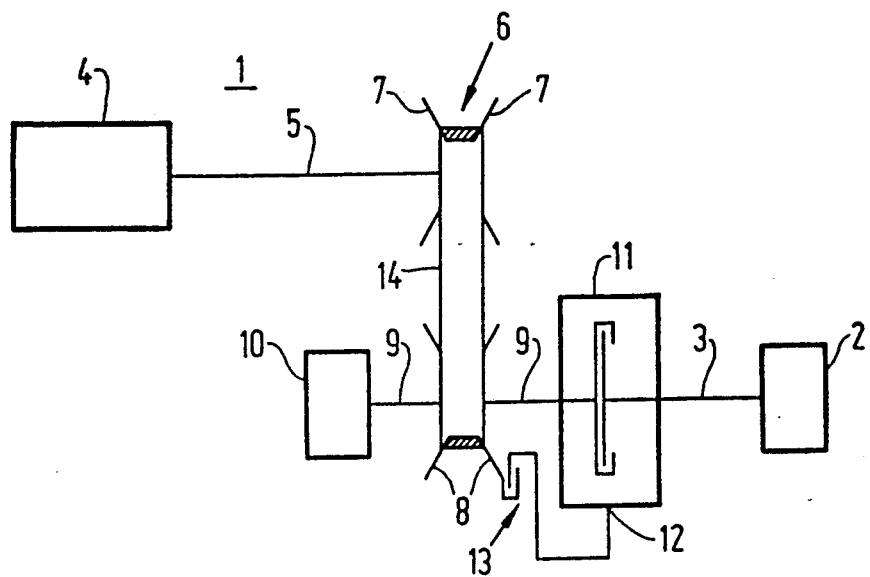
FIG. 1, illustrates an embodiment of the driving system for driving auxiliary equipment according to the invention.
Figure 2:
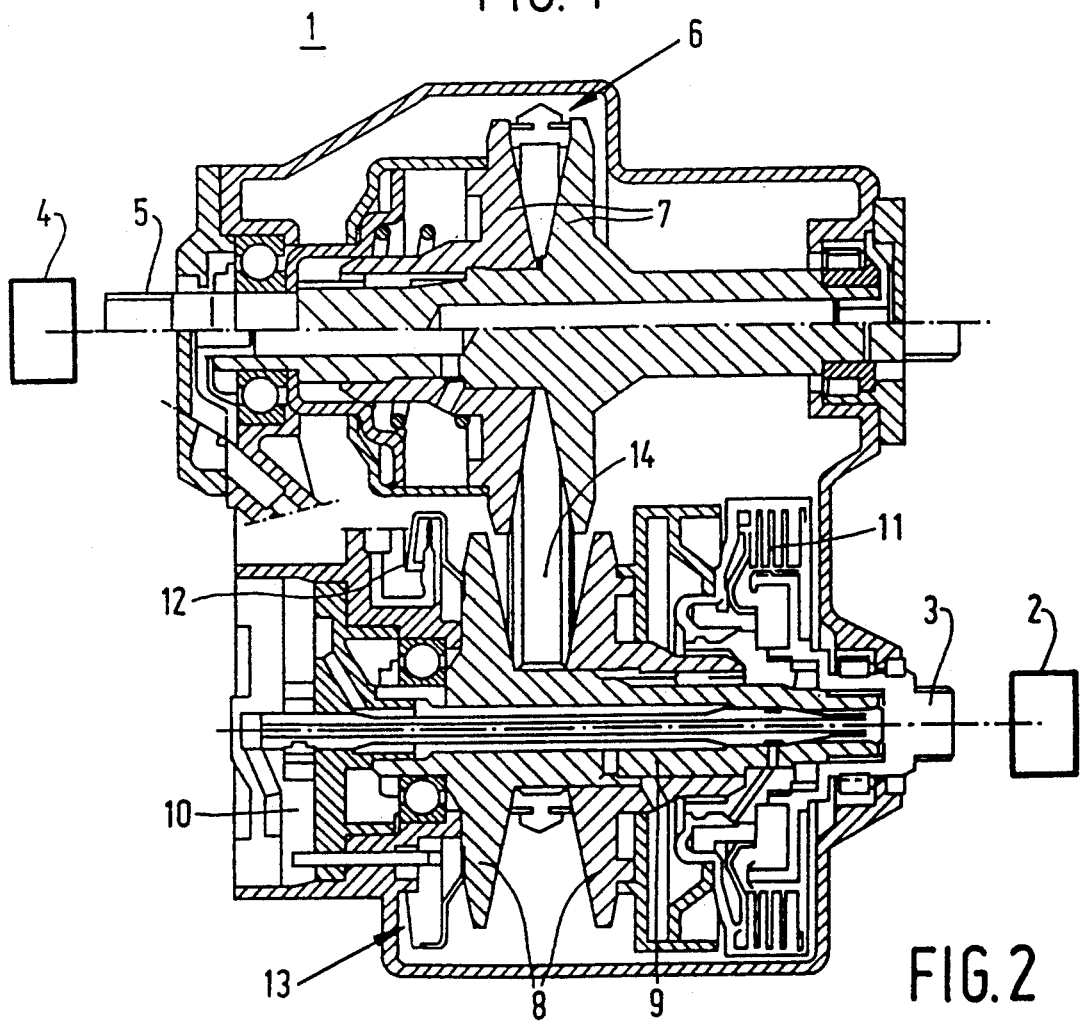
FIG. 2 is a detailed cross-sectional view of the driving system according to FIG. 1.

FIGS. 1 and 2 illustrate a driving system 1 for driving auxiliary equipment 2, said auxiliary equipment 2 being disposed on an outgoing shaft 3. The driving system contains an engine 4, which is connected to a primary shaft 5 of a continuously variable transmission 6. This may be any continuously variable transmission. In the drawing a continuously variable transmission of the belt-pulley type is shown. The transmission 6 comprises a primary pulley 7, on which the primary shaft 5 is disposed, and a secondary pulley 8, on which a secondary shaft 9 is disposed. A pump 10 is connected to the secondary shaft 9. The torque transmission of the primary pulley 7 to the secondary pulley 8 takes place by means of a driving belt 14. The respective pulleys 7 and 8 each consist of a pair of discs, at least one of which being axially movable for adjusting the transmission ratio. The disc can e.g. be moved by supplying or discharging, as the case may be, pressure delivered by the pump. The means (not shown) with which the meanwhile generally known continuously variable transmission 6 is further controlled and with which the transmission ratio is influenced, are considered to be known. Said control will be arranged in such a manner that at stationary operation of the driving system 1 the number of revolutions of the secondary shaft 9 is kept substantially constant. The driving system 1 furthermore contains a clutch 11 which is connected between the secondary shaft 9 and the outgoing shaft 3. The clutch 11 can be engaged by supplying a signal to the control input 12. The driving system furthermore contains means 13 which are connected to the control input 12, said means 13 being coupled to the secondary shaft 9 for measuring the number of revolutions of the secondary shaft 9. The means shown in the Figures are indicated as a generally known Pitot tube. Said Pitot tube delivers a hydraulic signal to the control input 12 of the clutch 11. If desired said means 13 may also be equipped with generally known electric means for influencing, by means of an electric signal to the control input 12, the engagement of the clutch 11.

Also other, e.g. hydraulic/mechanical speed regulators can be used within this framework. Furthermore the clutch 11 may also be a centrifugal clutch. The operation of the driving system 1 is such that during a starting-up phase the engine 4 is started and with it the pulley 7, 8 and the pump 10 are directly set in action. The pump 10 will not immediately supply sufficient pressure for clamping the driving belt 14 between the pulleys 7 and 8 with sufficient force. For that purpose the system may be provided with means temporarily overcoming this, however. Said means may e.g. be springs disposed in the pulleys, or an accumulator which temporarily delivers sufficient pressure. After the starting-up phase, when said combination has been brought up to speed, the clutch, at the control of the signal delivered to the control input 12 by the means 13, will effect a connection between the secondary shaft 9 and the outgoing shaft 3, thus setting the auxiliary equipment 2 in action and bringing said auxiliary equipment up to a substantially nominal constant speed.

It is not relevant for the invention whether the pump 10, possibly in combination with the clutch 11, is disposed at the side of the stationary disc or at the side of the movable disc or that on the contrary, in contrast to that which is illustrated in the Figure, the pump 10 and the clutch 11 have changed places.

On the basis of the above explanation variants of the explained embodiments of the driving system which are obvious to a person skilled in the art are considered to fall within the scope of the claims hereinafter.

I claim:

1. Driving system for auxiliary equipment, characterized in that the system comprises a continuously variable transmission with a primary shaft to be driven by the engine, a secondary shaft, and an outgoing shaft selectively driveable by said secondary shaft and connectable to said auxiliary equipment.

2. Driving system according to claim 1, characterized in that the system comprises a pump mounted on the secondary shaft and a clutch connected between the secondary shaft and the outgoing shaft.

3. Driving system according to claim 2, characterized in that the driving system contains means for delivering a signal which is a measure for the number of revolutions of the secondary shaft, and that the clutch is of an engageable construction and is connected to said means for coupling, at the control of the signal, the secondary shaft to the outgoing shaft and the auxiliary equipment disposed thereon when a minimum limiting value of the number of revolutions of the secondary shaft is exceeded.

4. Driving system according to claim 2, characterized in that said clutch is a centrifugal clutch.

5. Driving system according to claim 4, characterized in that the minimum limiting value of the number of revolutions above which the clutch engages lies under the nominal number of revolutions of the secondary shaft.

6. Driving system according to any one of the claims 2-5, characterized in that the clutch includes means for disengaging it above a maximum limiting value of the number of revolutions of the secondary shaft, which lies above the nominal number of revolutions of the secondary shaft.

7. Driving system according to any one of the claims 2-5, characterized in that the system includes means for maintaining the number of revolutions of the secondary shaft constant when a maximum engine speed is exceeded.

8. Driving system according to any one of the claims 2-5, further including means for permitting the clutch to slip at a torque which is lower than a torque at which the continuously variable transmission starts to slip.

* * * * *